(12) United States Patent
Inagaki et al.

(10) Patent No.: US 11,826,770 B2
(45) Date of Patent: Nov. 28, 2023

(54) NEBULIZER, SAMPLE INTRODUCTION UNIT, AND ANALYSIS DEVICE

(71) Applicant: National Institute of Advanced Industrial Science and Technology, Tokyo (JP)

(72) Inventors: Kazumi Inagaki, Tsukuba (JP); Shinichi Miyashita, Tsukuba (JP); Shinichiro Fujii, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 713 days.

(21) Appl. No.: 16/971,969

(22) PCT Filed: Jan. 16, 2019

(86) PCT No.: PCT/JP2019/001120
§ 371 (c)(1),
(2) Date: Aug. 21, 2020

(87) PCT Pub. No.: WO2019/163337
PCT Pub. Date: Aug. 29, 2019

(65) Prior Publication Data
US 2020/0391235 A1  Dec. 17, 2020

(30) Foreign Application Priority Data

Feb. 23, 2018 (JP) ................ 2018-031281

(51) Int. Cl.
*B05B 7/06* (2006.01)
*G01N 1/38* (2006.01)
(Continued)

(52) U.S. Cl.
CPC ............... *B05B 7/066* (2013.01); *G01N 1/38* (2013.01); *G01N 27/62* (2013.01); *G01N 27/626* (2013.01);
(Continued)

(58) Field of Classification Search
CPC ......... B05B 7/066; B05B 7/22; B05B 7/2494; B05B 15/52; G01N 1/38; G01N 27/62;
(Continued)

(56) References Cited

U.S. PATENT DOCUMENTS

| 4,575,609 A | 3/1986 | Fassel et al. | |
| 6,166,379 A | 12/2000 | Montaser et al. | |
| 2015/0206729 A1* | 7/2015 | Inagaki | H01J 49/045 |
| | | | 250/288 |

FOREIGN PATENT DOCUMENTS

| JP | H09-239298 A | 9/1997 |
| JP | 2009-510670 A | 3/2009 |

(Continued)

OTHER PUBLICATIONS

Kazumi Inagaki et al., "High performance concentric nebulizer for low-flow rate liquid sample introduction to ICP-MS," J. Anal. At. Spectrom., 2011, vol. 26, pp. 623-630.

(Continued)

*Primary Examiner* — Farhana A Hoque
(74) *Attorney, Agent, or Firm* — Locke Lord LLP; James E. Armstrong, IV; Nicholas J. DiCeglie, Jr.

(57) ABSTRACT

To provide: an atomizer that allows a sample liquid to be made into minute droplets stably and that inhibits clogging of an aerosol gas outlet by salting out or the like when atomizing a sample containing a high density matrix; a sample introduction unit that includes the atomizer; and an analysis device. An atomizer includes: a liquid supply tube that has a first channel in which a liquid can circulate and (Continued)

that has, on one end, an outlet to spray the liquid; and a gas supply tube that encloses the liquid supply tube with a gap therebetween, that has a second channel in which a gas can circulate, and that has, on one end, an outlet to spray the gas. The second channel is defined by the outer circumferential face of the liquid supply tube and the inner circumferential face of the gas supply tube and has a narrow portion upstream of the outlet.

16 Claims, 8 Drawing Sheets

(51) Int. Cl.
*G01N 27/626* (2021.01)
*G01N 27/62* (2021.01)
*G01N 21/73* (2006.01)

(52) U.S. Cl.
CPC ....... *G01N 21/73* (2013.01); *G01N 2001/387* (2013.01)

(58) Field of Classification Search
CPC ................. G01N 27/626; G01N 21/73; G01N 2001/387; G01N 2001/002; G01N 21/714

USPC .......................................... 324/468; 250/288
See application file for complete search history.

(56) References Cited

FOREIGN PATENT DOCUMENTS

| JP | 2010-014465 A | 1/2010 |
| JP | 5408555 B2 | 2/2014 |
| JP | 2015-138616 A | 7/2015 |
| WO | 07/027784 A2 | 3/2007 |

OTHER PUBLICATIONS

K. Inagaki, "Development of High-Function Nebulizer for Plasma Spectrometric Determination: Sample Injection Sprayer with Interchangeable Coaxial Triple Tube Structure," AIST Today, Sep. 2010, vol. 10, No. 9, p. 14 and information sheets.
International Search Report dated Apr. 16, 2019, issued for PCT/JP2019/001120.

* cited by examiner

NEBULIZER, SAMPLE INTRODUCTION UNIT, AND ANALYSIS DEVICE

TECHNICAL FIELD

The present invention relates to nebulizers, sample introduction units, and analysis devices, and in particular, to a nebulizer, a sample introduction unit, and an analysis device which are usable for an inductively coupled plasma optical emission spectrometry and an inductively coupled plasma mass spectrometry.

BACKGROUND ART

An inductively coupled plasma optical emission spectrometry (ICP-OES) device and an inductively coupled plasma mass spectrometry (ICP-MS) device are highly sensitive and element-selective analysis devices. These analysis devices can perform trace element analysis, and are in use in a wide range of fields, such as impurity assessment of semiconductors, impurity assessment of functional materials, and environment monitoring, and food monitoring.

Generally, ICP-OES and ICP-MS have been used in trace element analysis of liquid samples. In recent years, however, as new applications of ICP-OES and ICP-MS, methods of analyzing particulate matter on a particle-by-particle basis have received attention. Specifically, ICP-OES and ICP-MS are now applied to composition measurement, size distribution measurement, and number concentration quantification of particulate matter including nano-micro particles, drug delivery system (DDS) monitoring using particles, and further, cell counting, component analysis of individual cells, metabolic analysis, etc.

In ICP-OES and ICP-MS, the following methods are generally employed to introduce a sample liquid into a plasma: a method in which a sample liquid is formed into fine droplets using a nebulizer, and then, large droplets are removed using a spray chamber so that the fine droplets of the sample liquid are introduced into a plasma (see, for example, Patent Document 1 and Non-Patent Document 1); and a method in which a sample liquid is directly sprayed and introduced into a plasma using a device composed of a plasma torch having a nebulizer incorporated therein (see, for example, Patent Documents 2 and 3).

Patent Document 1: Japanese Patent No. 5408555
Patent Document 2: U.S. Pat. No. 6,166,379, Specification
Patent Document 3: U.S. Pat. No. 4,575,609, Specification

Non-Patent Document

Non-Patent Document 1: Kazumi Inagaki et al., J. Anal. At. Spectrom., 2011, vol. 26, pp. 623-630

DISCLOSURE OF THE INVENTION

Problems to be Solved by the Invention

An object of the present invention is to provide a nebulizer, a sample introduction unit including the nebulizer, and an analysis device, the nebulizer being capable of stably forming a sample liquid into fine droplets, and capable of inhibiting an outlet of a nebulizing gas from becoming clogged with a salt deposition or the like when nebulizing a sample containing a highly concentrated matrix.

Means for Solving the Problems

According to an aspect of the present invention, a nebulizer is provided which includes: a liquid supply tube having a first channel which allows a liquid to flow therethrough, and having, at an end thereof, a first outlet from which the liquid is ejected; and a gas supply tube surrounding the liquid supply tube with a gap interposed therebetween, having a second channel which allows a gas to flow therethrough, and having, at an end corresponding to the end, a second outlet from which the gas is ejected. The second channel is defined between an outer peripheral surface of the liquid supply tube and an inner peripheral surface of the gas supply tube, and has a constriction portion located upstream of the first outlet.

In the nebulizer according to this aspect, the second channel, which is defined between the outer peripheral surface of the liquid supply tube and the inner peripheral surface of the gas supply tube and which allows a gas to flow therethrough, is provided with the constriction portion that is located upstream of the outlet of the liquid supply tube. With this configuration, the nebulizer can increase, at the constriction portion, the pressure of the gas flowing through the second channel, and can cause the gas that has passed to flow at an increased velocity, whereby the flow rate of the gas can be reduced as compared with the known art. Thus, the nebulizer provided by the present invention is capable of stably forming a liquid into fine droplets when the liquid is ejected from the outlet of the liquid supply tube. Further, the above configuration can inhibit the droplets ejected from the first outlet from flowing backward through the second channel and entering the constriction portion. Consequently, it is possible to inhibit the constriction portion from becoming clogged with components contained in the droplets, for example, due to a salt deposition, whereby the provided nebulizer is capable of stable ejection.

According to another aspect of the present invention, a sample introduction unit is provided which includes: the nebulizer according to the above aspect; and an other gas supply tube surrounding the gas supply tube with an other gap interposed therebetween, the other gap serving as a third channel which allows an other gas to flow therethrough, the other gas supply tube being disposed coaxial with the liquid supply tube and the gas supply tube, and having, at an end corresponding to the end, a third outlet from which the other gas is ejected.

In the sample introduction unit according to this aspect, the nebulizer ejects a liquid in the form of fine droplets, and the other gas ejected from the third outlet flows while surrounding the fine droplets of the liquid, whereby the fine droplets of the liquid are allowed to stably flow in an ejection direction, without spreading laterally.

According to still another aspect of the present invention, an analysis device is provided which includes: the sample introduction unit according to the above aspect; a plasma generator generating a plasma and ionizing or atomizing, with the plasma, a sample formed into droplets and ejected by the nebulizer; and an analysis unit analyzing the atomized or ionized sample.

According to this aspect, the nebulizer can inhibit the droplets ejected from the first outlet from flowing backward through the second channel and from entering the constriction portion. Consequently, the constriction portion can be inhibited from becoming clogged with precipitates of components contained in the droplets, and the ejection can be stabilized, whereby an analysis can be conducted stably.

PREFERRED MODE FOR CARRYING OUT THE INVENTION

Figure 1:
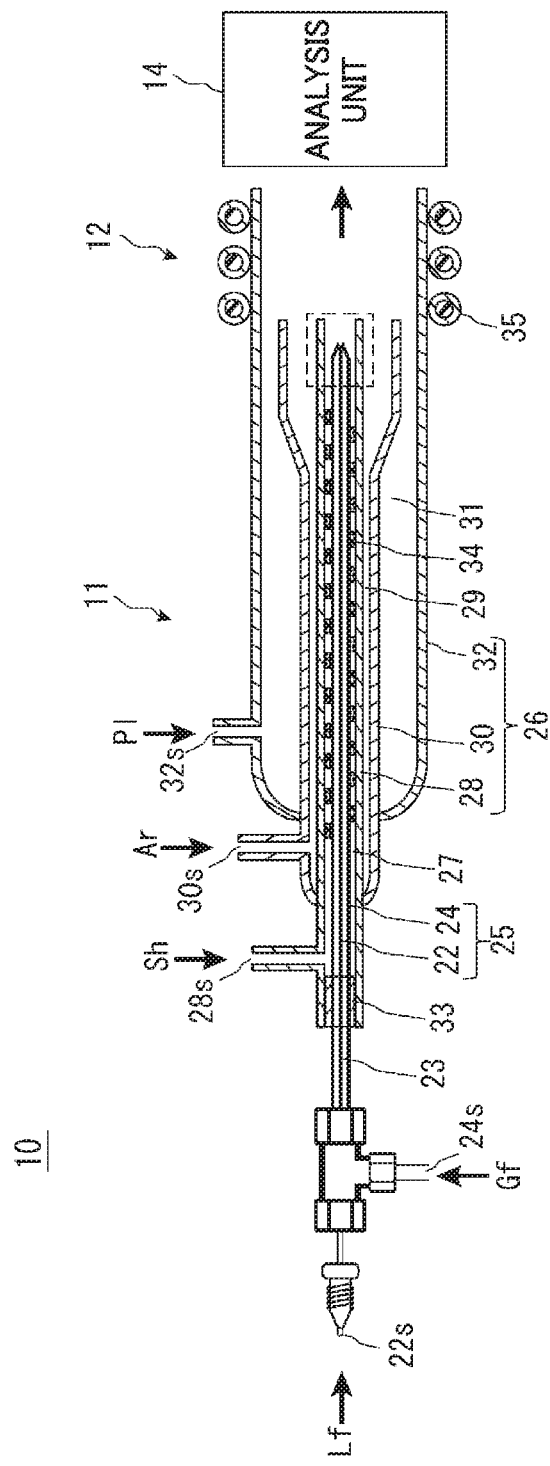
FIG. 1 is a diagram schematically showing a configuration of an analysis device according to an embodiment of the present invention.

In Patent Document 1, the present inventors have proposed a nebulizer capable of introducing a trace amount of a sample into a plasma even when a highly viscous fluid is used as the sample. The present invention is intended to enhance the performance of the nebulizer of Patent Document 1. Specifically, the present invention is intended to achieve an object to provide a nebulizer capable of ejecting a sample liquid in the form of fine droplets and capable of inhibiting an outlet of a nebulizing gas from becoming clogged with a salt deposition or the like when nebulizing a sample containing a highly concentrated matrix.

An embodiment of the present invention will be described with reference to the drawings. Note that a common element is denoted by the same reference character in two or more of the drawings, and a detailed description of such a common element will not be repeated.

Figure 2A:
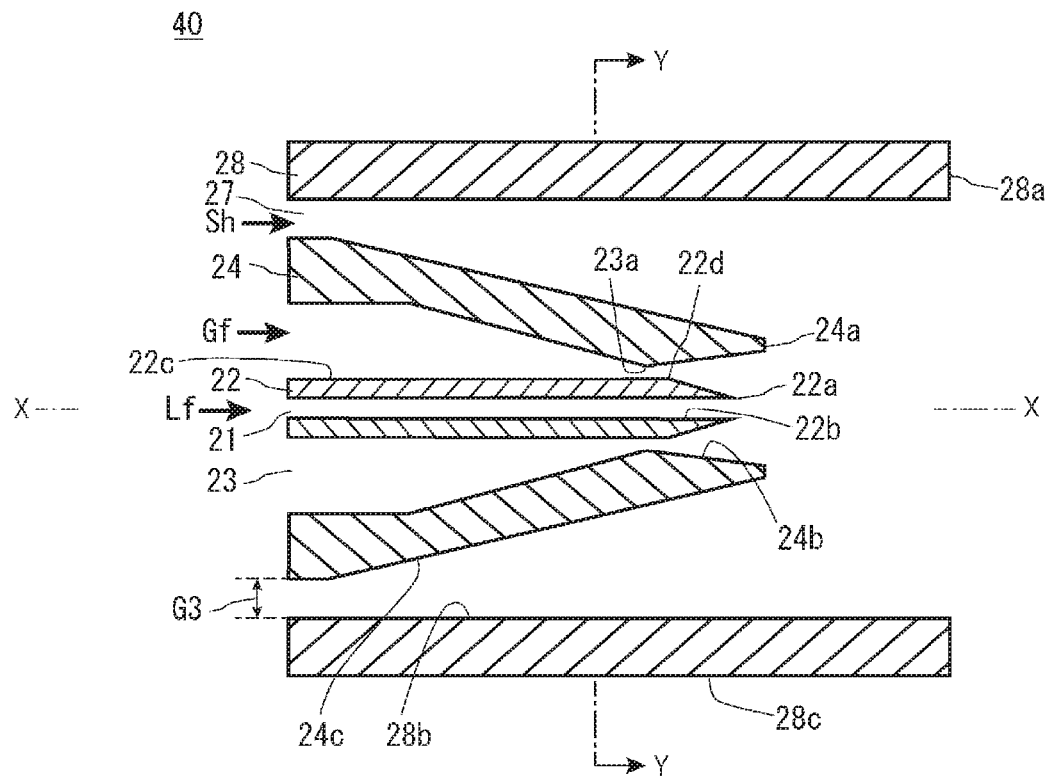
FIGS. 2A and 2B are cross-sectional view of a nozzle of a sample introduction unit according to an embodiment of the present invention.
Figure 2B:
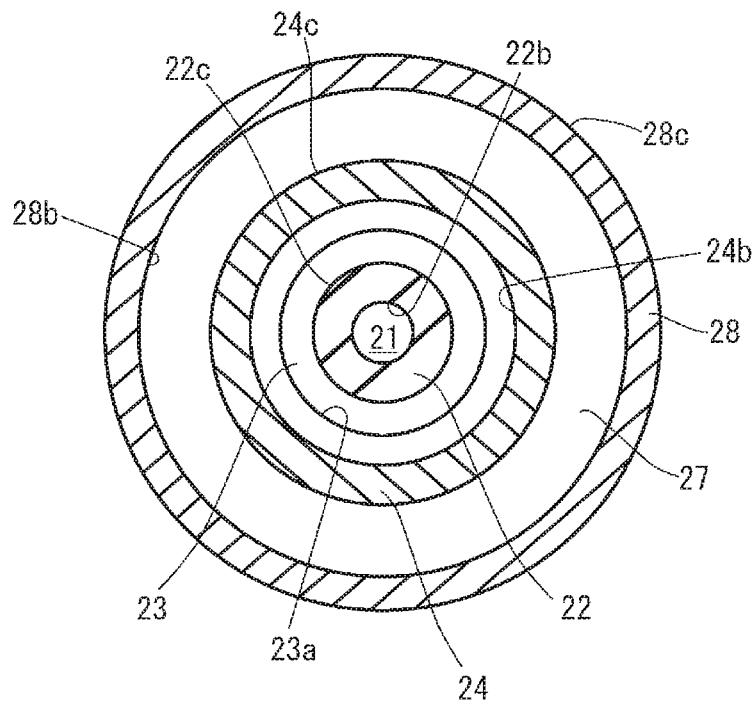
Figure 3:
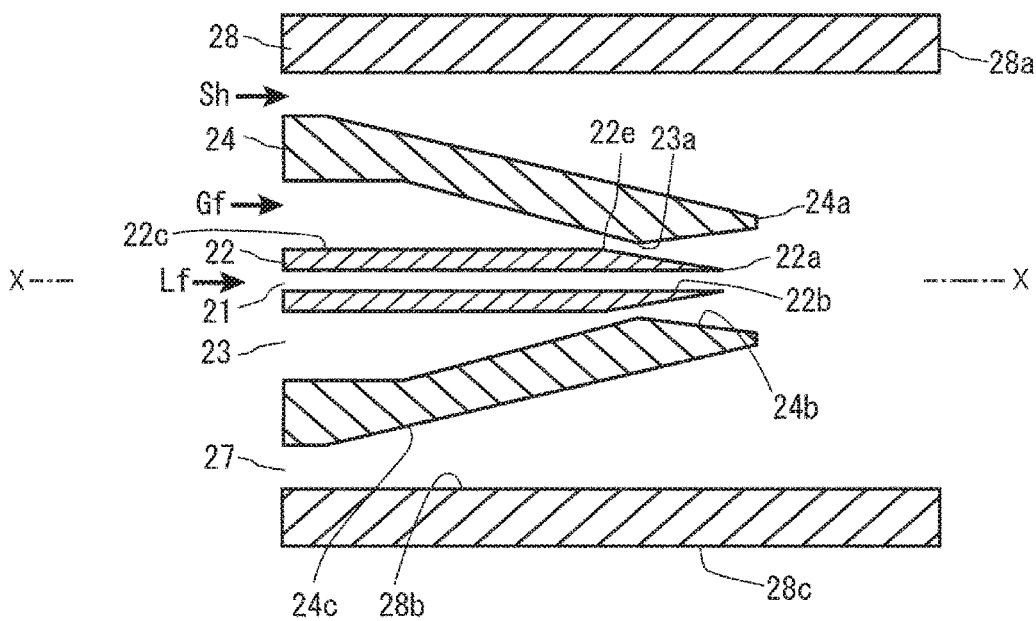
FIG. 3 is a cross-sectional view of a modification 1 of the nozzle of the sample introduction unit according to the embodiment of the present invention.
Figure 4:
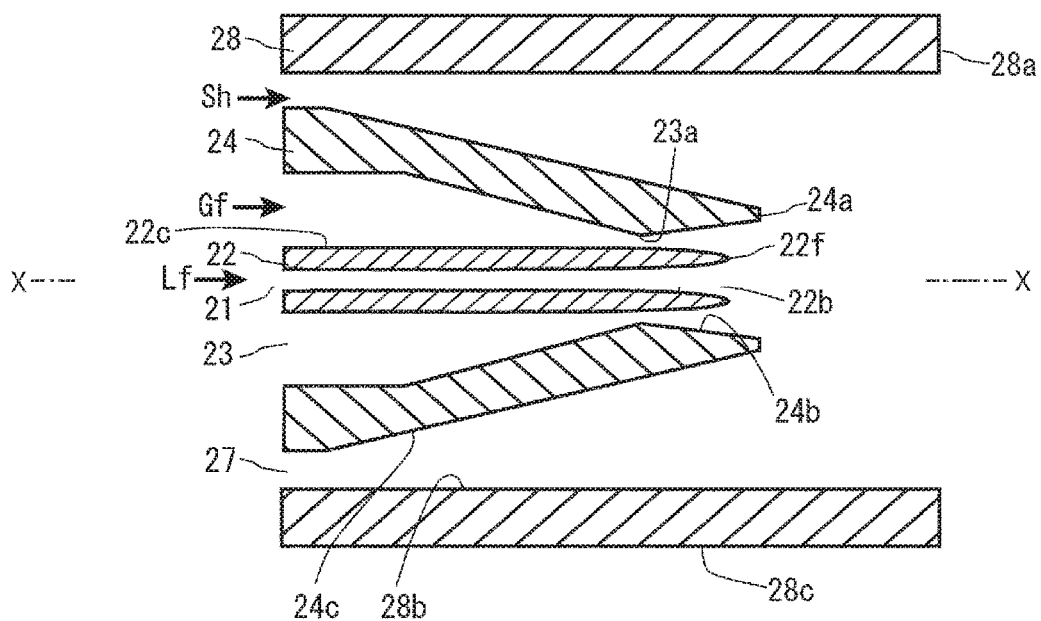
FIG. 4 is a cross-sectional view of a modification 2 of the nozzle of the sample introduction unit according to the embodiment of the present invention.
Figure 5:
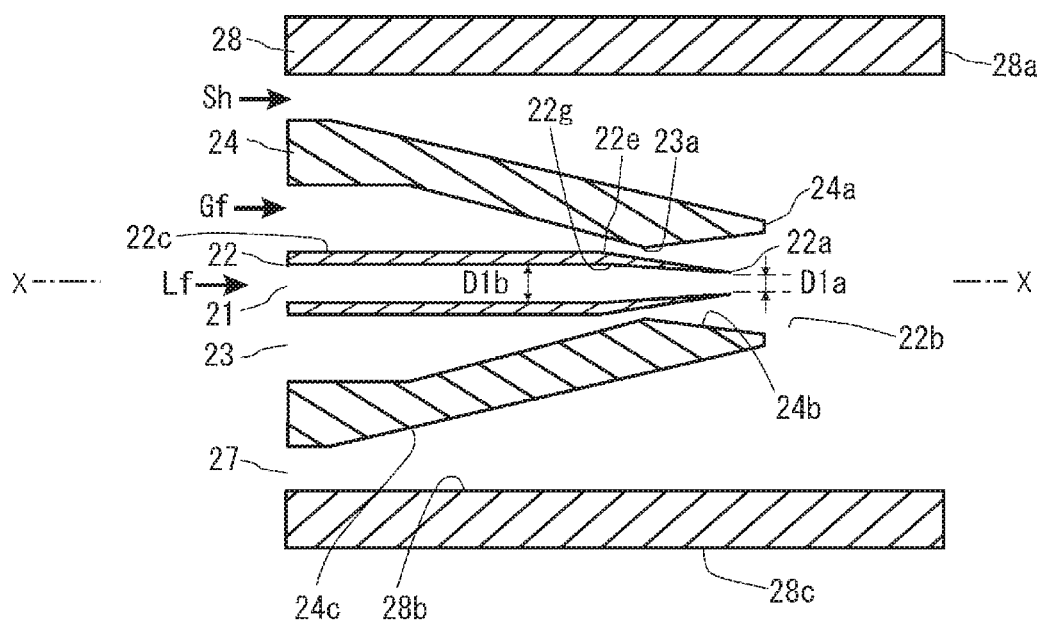
FIG. 5 is a cross-sectional view of a modification 3 of the nozzle of the sample introduction unit according to the embodiment of the present invention.
Figure 6A:
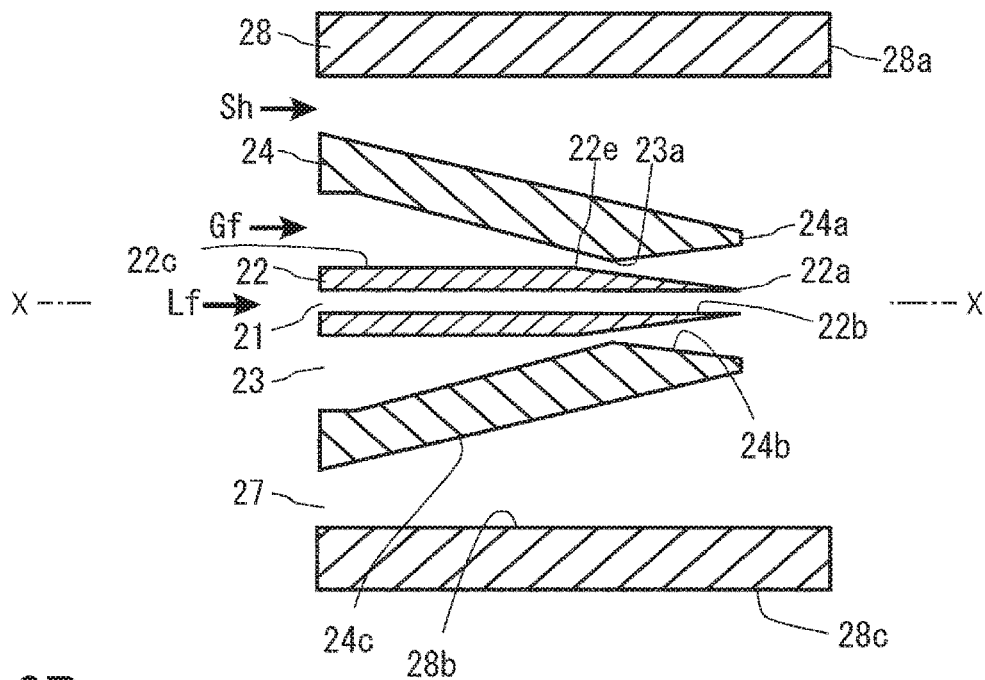
FIGS. 6A and 6B are cross-sectional view of modifications 4 and 5 of the nozzle of the sample introduction unit according to the embodiment of the present invention.
Figure 6B:
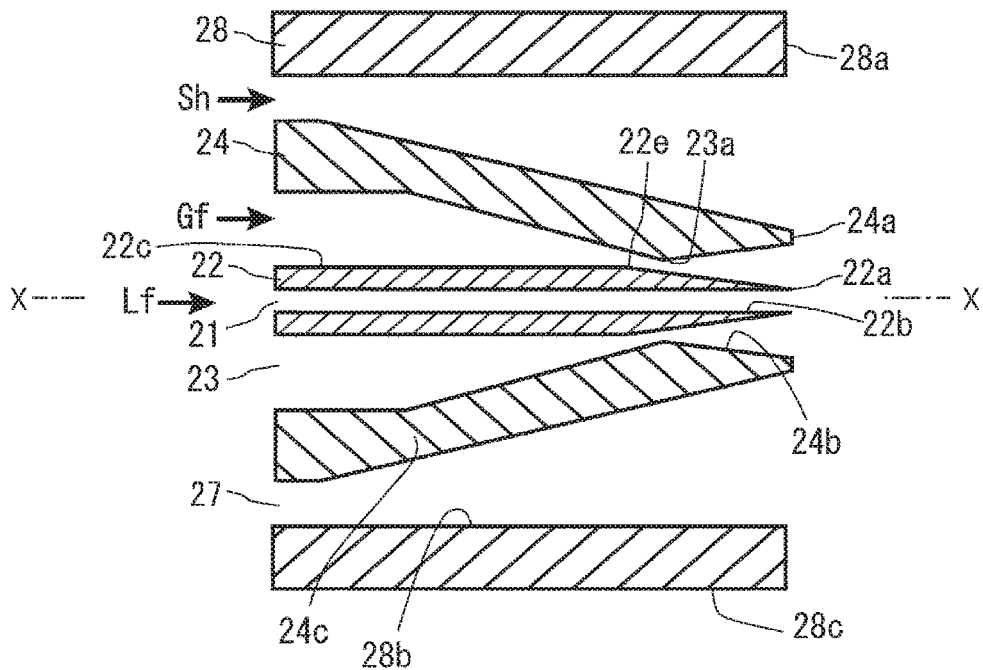
Figure 7A:
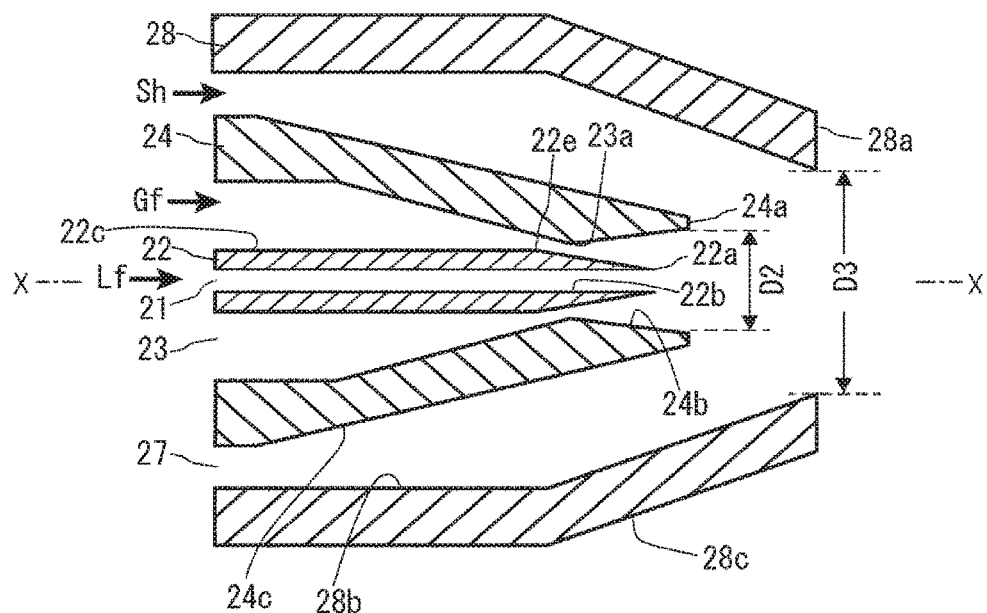
FIGS. 7A and 7B are cross-sectional view of modifications 6 and 7 of the nozzle of the sample introduction unit according to the embodiment of the present invention.
Figure 7B:
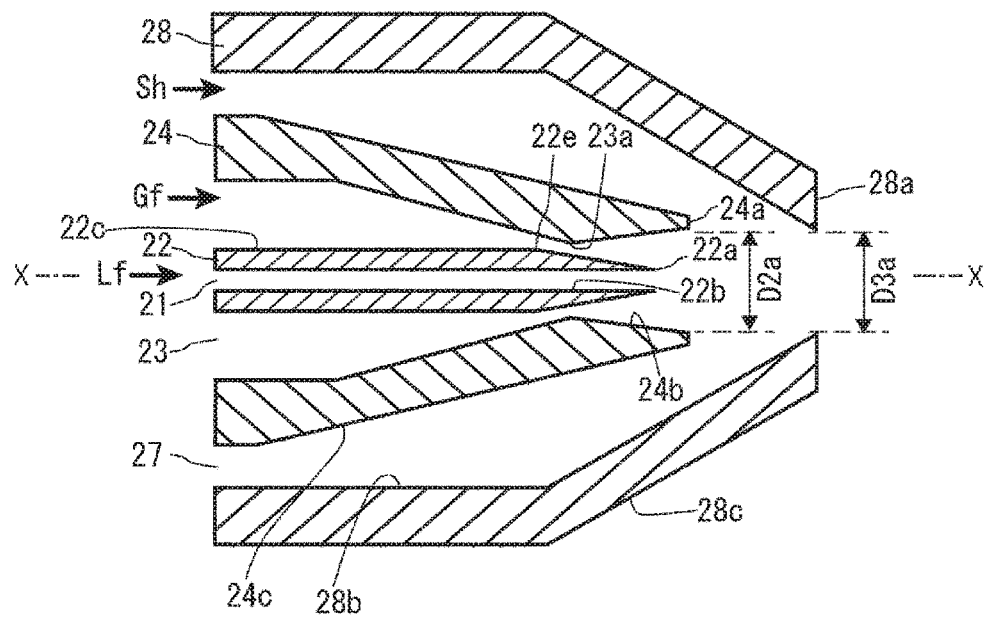
Figure 8:
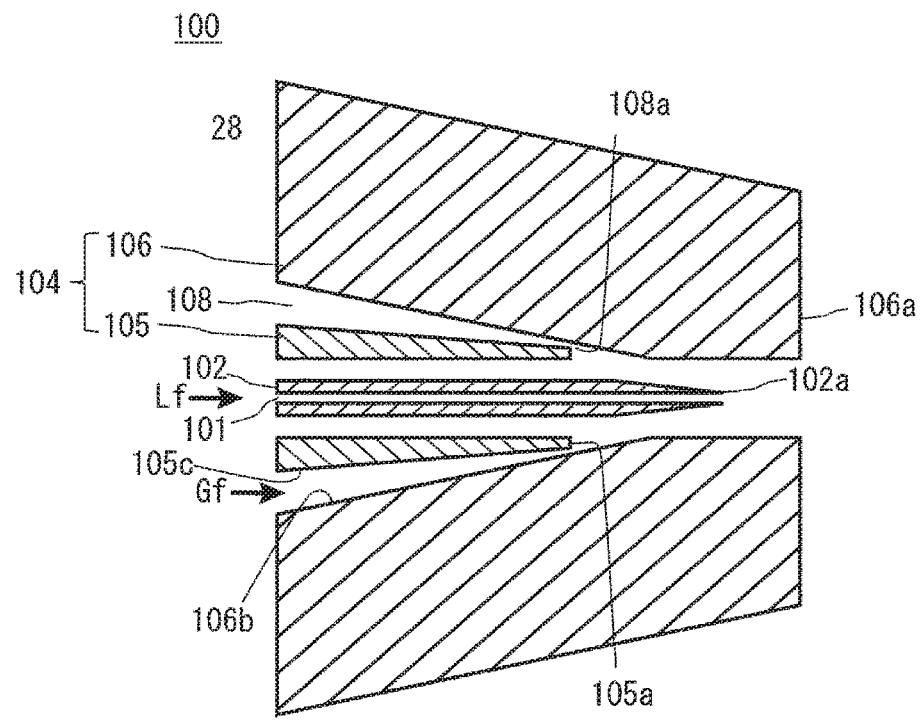
FIG. 8 is a cross-sectional view of a nozzle of a nebulizer of a comparative example.
Figure 9:
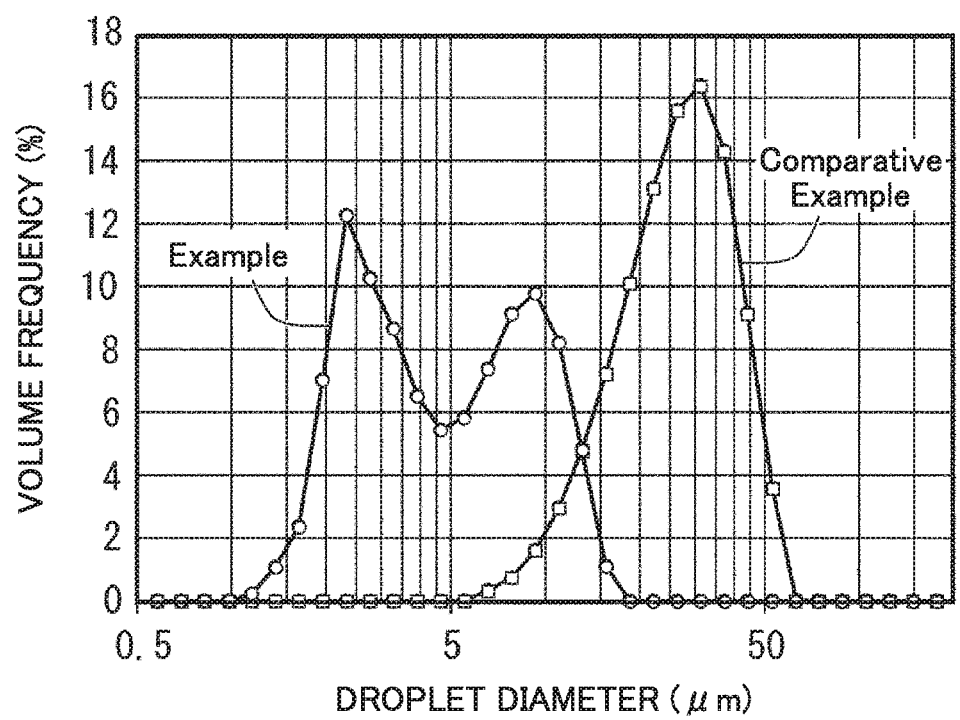
FIG. 9 is a graph showing a measurement example of particle size distribution of droplets ejected from a nebulizer of an example and the nebulizer of the comparative example.
Figure 10:
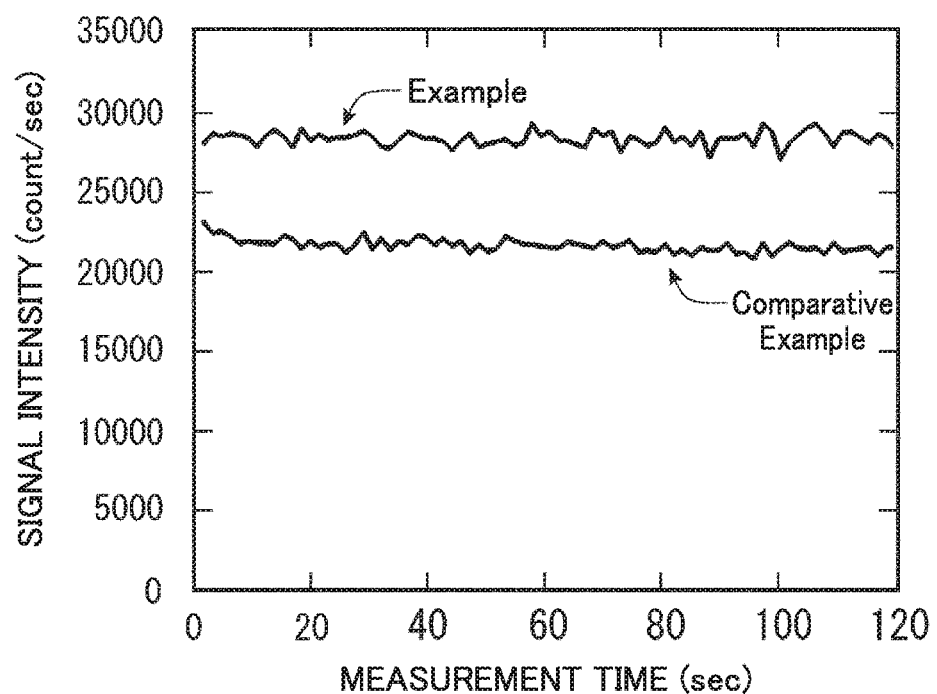
FIG. 10 is a graph showing a measurement example of trace elements contained in a sample liquid ejected by the nebulizer of the example and the nebulizer of the comparative example.

FIG. 1 is a diagram schematically showing a configuration of an analysis device according to an embodiment of the present invention. In FIG. 1, a major portion of a sample introduction unit is shown in cross section. FIGS. 2A and 2B are cross-sectional view of a nozzle of a nebulizer according to an embodiment of the present invention. Specifically, FIG. 2A is a cross-sectional view taken along a central axis X of the nebulizer, the central axis X extending in a longitudinal direction of the nebulizer, whereas FIG. 2B is a view along arrows Y-Y in FIG. 2A. For the sake of convenience of explanation, FIG. 2B shows the components at a different aspect ratio than that in FIG. 2A.

Referring to FIGS. 1, 2A, and 2B, the analysis device 10 according to the present embodiment includes: the sample introduction unit 11; a plasma generator 12 that generates a plasma and ionizes or atomizes, with the plasma, a sample ejected in the form of droplets from the sample introduction unit 11; and an analysis unit 14 that analyzes the atomized and ionized sample.

The sample introduction unit 11 has a multi-tube structure, and includes therein the nebulizer 25 and a plasma torch 26 that is disposed outside the nebulizer 25. The nebulizer 25 includes: a liquid supply tube 22 having a first channel 21 through which a sample liquid Lf flows; and a gas supply tube 24 surrounding the liquid supply tube 22 with a gap interposed therebetween, the gap serving as a second channel 23 through which a nebulizing gas Gf flows. The plasma torch 26 has: a tubular torch injector 28 surrounding the gas supply tube 24 of the nebulizer 25 with a gap interposed therebetween, the gap serving as a third channel 27 through which a sheath gas Sh flows; an intermediate torch tube 30 surrounding the torch injector 28 with a gap interposed therebetween, the gap serving as a fourth channel 29 through which an auxiliary gas Ar flows; and a torch outer tube 32 surrounding the intermediate torch tube 30 with a gap interposed therebetween, the gap serving as a fifth channel 31 through which a plasma gas P1 flows. As the auxiliary gas Ar and the plasma gas P1, argon gas is used, for example.

The sample introduction unit 11 has the nozzle 40 at the tip ends of the nebulizer 25 and the torch injector 28. That is, the nozzle 40 is adjacent to the plasma generator 12. The nozzle 40 ejects droplets of the sample liquid Lf, the nebulizing gas Gf, and the sheath gas Sh directly into a plasma of the plasma generator 12. Since the sheath gas Sh flows while surrounding a mist flow of the ejected sample liquid Lf, the mist flow is allowed to stably flow in an ejection direction without spreading laterally. The sample introduction unit 11 has, on a side opposite to the nozzle 40, supply ports 22*s*, 24*s*, 28*s*, 30*s*, and 32*s* via which the sample liquid Lf, the nebulizing gas Gf, the sheath gas Sh, the auxiliary gas Ar, and the plasma gas P1 are supplied, respectively.

The nebulizer 25 is inserted in the torch injector 28, and a side thereof adjacent to the supply port is fixed with a fastening member 33, so that the nebulizer 25 has a cantilevered structure. The gas supply tube 24 of the nebulizer 25 can be provided with a helical support member 34 that is wound around an outer peripheral surface 24*c* of the gas supply tube 24 and extends in a longitudinal direction of the gas supply tube 24, whereby a gap G3 is provided. This configuration makes it possible to reduce vibration of the nebulizer 25 having the cantilevered structure and to hold the nebulizer 25 at the center of the tube of the torch injector 28, whereby the ejected droplets can be inhibited from deviating in lateral directions with respect to the ejection direction. The sheath gas Sh helically flows through the gap of the helical support member 34. Consequently, the sheath gas Sh ejected from an outlet 24*a* forms a swirling flow, and flows while surrounding the ejected sample liquid and the ejected nebulizing gas. As a result, the sample liquid and the nebulizing gas are inhibited from spreading in lateral directions with respect to the ejection direction, and the droplets of the sample liquid can be stably introduced along a plasma central axis with respect to the ejection direction.

The plasma generator 12 includes a coil 35 wound around the torch outer tube 32. The coil 35 is connected to a high-frequency power supply and a control device (both not shown). A high frequency voltage is applied by way of the coil so that the plasma gas P1, e.g., argon gas, is ionized, whereby a plasma is generated within the torch outer tube 32. The components of the sample liquid formed into the droplets are atomized or ionized by the plasma.

The analysis unit 14 has, for example, an ion lens, a quadrupole mass filter, and a detection unit (all not shown) in a case where the analysis device 10 is an inductively coupled plasma mass spectrometry (ICP-MS) device. The ion lens converges the ions of the components of the sample liquid, the ions having been generated by the plasma generator 12. The quadrupole mass filter separates specific ions based on a mass-to-charge ratio. The detection unit detects the specific ions for each mass number, and outputs corresponding signals. In a case where the analysis device 10 is an inductively coupled plasma optical emission spectrometry (ICP-OES) device, the analysis unit 14 has, for example, a spectroscope unit and a detection unit. When the components of the sample liquid have been atomized and excited by the plasma generator 12 and the atoms return to a low energy level, an emission spectral line is emitted. The spectroscope unit and the detection unit detect the emission spectral line, specify a component element from a wavelength of the emission line, and determine the component content from an intensity of the emission line.

As shown in FIGS. 2A and 2B, the nozzle 40 is composed of the tip ends of the liquid supply tube 22 and the gas supply tube 24 of the nebulizer 25 and the tip end of the torch injector 28. The nozzle 40 includes an outlet 22a of the liquid supply tube 22, an outlet 24a of the gas supply tube 24, and an outlet 28a of the torch injector 28.

The liquid supply tube 22 has, for example, the tubular first channel 21 defined by an inner peripheral surface 22b of the liquid supply tube 22, and opens at the outlet 22a. A diameter (inner diameter) defined by the inner peripheral surface 22b of the liquid supply tube 22 is preferably 10 μm to 250 μm. A diameter (outer diameter) defined by an outer peripheral surface 22c of the liquid supply tube 22 is preferably 100 μm to 400 μm. A diameter (inner diameter) defined by the inner peripheral surface 22b of the outlet 22a is preferably 5 μm to 75 μm, in order to form fine droplets. The liquid supply tube 22 may be made of glass, plastic, or the like, but is preferably made of quartz glass, in particular, fused quartz glass.

The liquid supply tube 22 is configured such that the sample liquid Lf is supplied from the supply port 22s while being pressurized, flows through the first channel 21, and then, is ejected from the outlet 22a. The sample liquid Lf ejected from the outlet 22a is formed into fine droplets by the nebulizing gas Gf from the second channel 23 of the gas supply tube 24, and the fine droplets flow toward the outlet of the nozzle 40. The sample liquid Lf may be supplied continuously or intermittently from a container of the sample liquid Lf using a pump or the like. The sample liquid Lf is a liquid containing a trace element to be analyzed, and includes, for example, a dissolved component, particulate matter, etc.

The gas supply tube 24 has the second channel 23 defined between an inner peripheral surface 24b of the gas supply tube 24 and the outer peripheral surface 22c of the liquid supply tube 22. An inner peripheral side of the second channel 23 opens at the outlet 22a of the liquid supply tube, and an outer peripheral side opens at the outlet 24a. The gas supply tube 24 is configured such that the nebulizing gas Gf is supplied from the supply port 24s while being pressurized, flows through the second channel 23, and is ejected from the outlet 24a. A flow rate of the nebulizing gas Gf is set to 0.2 L per minute, for example. As the nebulizing gas Gf, an inert gas such as argon gas can be used, for example. The gas supply tube 24 may be made of glass, plastic, or the like, but is preferably made of quartz glass, in particular, fused quartz glass.

The second channel 23 is shaped such that its channel area gradually decreases in an upstream-to-downstream in a region corresponding to the nozzle 40, and is provided with a constriction portion 23a at which the channel area is minimized. Here, the channel area refers to an area occupied by the second channel 23 on a plane perpendicular to the central axis X, and is the area defined between the inner peripheral surface 24b and the outer peripheral surface 22c in FIG. 2B. At the constriction portion 23a, the distance between the inner peripheral surface 24b and the outer peripheral surface 22c is preferably set to 5 μm to 20 μm. In a region which is located upstream of the constriction portion 23a and in which the diameter does not decrease, the distance between the inner peripheral surface 24b and the outer peripheral surface 22c is preferably set to 100 μm to 250 μm. At the constriction portion 23a, the pressure of the nebulizing gas flowing through the second channel 23 increases so that the nebulizing gas that has passed through the constriction portion 23a flows at an increased flow velocity (linear velocity), thereby promoting the formation of the fine droplets of the sample liquid Lf ejected from the outlet 22a of the liquid supply tube 22. Further, by setting the distance between the inner peripheral surface 24b and the outer peripheral surface 22c at the constriction portion 23a to be shorter than in the conventional nebulizer, more favorable fine droplets can be formed at a nebulizing gas flow rate of about one-fifth the flow rate in the conventional nebulizer. Consequently, the vaporization and decomposition of the droplets in the plasma of the plasma generator 12 results in stabilized atomization or ionization. As a result, a measurement signal has a stable strength.

The constriction portion 23a is located upstream of the outlet 22a of the liquid supply tube 22. This configuration can inhibit the droplets ejected from the outlet 22a from flowing backward through the second channel 23 and entering the constriction portion 23a. Consequently, it is possible to inhibit the constriction portion 23a from becoming clogged with components contained in the droplets, for example, due to a salt deposition, thereby enabling stable ejection. Further, the above configuration induces a flow-focus effect that allows the droplets to be ejected from the outlet 22a at a narrower angle (i.e., in a smaller lateral spreading range with respect to the ejection direction), as compared with the conventional nebulizer including no constriction portion, whereby the ejected droplets can be inhibited from colliding with the inner peripheral surface 28b of the torch injector 28. In the above configuration, the tip end of the nebulizer 25 (the outlet 22a of the liquid supply tube 22 and the outlet 24a of the gas supply tube 24) is more distant from the plasma generator 12 than the outlet 28a of the torch injector 28 is. Consequently, the linear velocity of the droplets can be reduced before the droplets reach the plasma of the plasma generator 12. This also stabilizes atomization or ionization by the evaporation and decomposition of the droplets in the plasma of the plasma generator 12, thereby allowing the measurement signal to have a stabilized strength. Further, the effect of heat of the plasma is reduced thus inhibiting the temperature from increasing in the vicinity of the outlet 22a of the liquid supply tube 22 and the outlet 24a of the gas supply tube 24. Consequently, it is possible to inhibit the second channel 23, through which the nebulizing gas Gf is ejected, from becoming clogged with components contained in the sample liquid Lf, for example, due to a salt deposition. The constriction portion 23a is preferably provided upstream from the outlet 22a by 50 µm to 2000 µm.

The second channel 23 can have such a shape that the channel area gradually increases from the constriction portion 23a to at least the outlet 22a of the liquid supply tube 22. This configuration allows the nebulizing gas to flow while surrounding the mist flow of the ejected droplets, whereby the mist flow is inhibited from spreading in lateral directions with respect to the ejection direction. As shown in FIG. 2A, the gas supply tube 24 may have such a shape that the diameter defined by the inner peripheral surface 24b gradually decreases (i.e., the tube 24 decreases in diameter) toward the constriction portion 23a, and then, gradually increases (i.e., the tube 24 increases in diameter) from the constriction portion 23a toward the outlet 24a.

In the gas supply tube 24, a diameter defined by the inner peripheral surface 24b of the outlet 24a is preferably equal to or larger than the diameter defined by the inner peripheral surface 22b of the outlet 22a of the liquid supply tube 22. With this configuration, the mist flow of the ejected droplets is inhibited from being disturbed by the nebulizing gas in the vicinity of the outlet 22a of the liquid supply tube 22. The diameter (inner diameter) defined by the inner peripheral surface 24b of the outlet 24a is preferably 50 µm to 500 µm. Further, in a cross section of the gas supply tube 24 along the central axis X, an angle formed between the inner peripheral surface 24b toward the outlet 24a and the central axis X is preferably 0 degrees or more and 60 degrees or less.

The outlet 24a of the gas supply tube 24 is preferably formed downstream of the outlet 22a of the liquid supply tube 22. With this configuration, the mist flow of the ejected droplets is inhibited from being disturbed by the nebulizing gas in the vicinity of the outlet 22a of the liquid supply tube 22.

The liquid supply tube 22 can have such a shape that the diameter defined by the outer peripheral surface 22c thereof gradually decreases toward the outlet 22a. This configuration reduces, in the vicinity of the outlet 22a, generation of a vortex of the nebulizing gas flowing from the second channel 23, and causes the nebulizing gas to flow along the mist flow of the ejected droplets. Furthermore, the liquid supply tube 22 can have a diameter-decrease start point 22d from which the diameter defined by the outer peripheral surface 22c decreases, the point 22d being provided downstream of the constriction portion 23a. This configuration makes it easy to position the constriction portion 23a when the liquid supply tube and the gas supply tube are assembled.

The liquid supply tube 22 can have such a shape that the diameter defined by the inner peripheral surface 22b thereof is constant toward the outlet 22a. Further, in a cross section along the longitudinal direction, an tip end of the liquid supply tube 22 at the outlet 22a can be pointed downstream. This configuration can narrow the lateral spreading (spray angle) of the mist flow of the ejected droplets, with respect to the ejection direction.

The torch injector 28 has the third channel 27 defined between the inner peripheral surface 28b of the torch injector 28 and the outer peripheral surface 24c of the gas supply tube 24. An inner peripheral side of the third channel 27 opens at the outlet 24a of the gas supply tube 24, and an outer peripheral side opens at the outlet 28a. The inner peripheral surface 28b of the torch injector 28 is parallel to the central axis X of the nebulizer 25. The torch injector 28 is configured such that the sheath gas Sh is supplied from the supply port 28s, flows through the third channel 27, and is ejected from the outlet 28a. A flow rate of the sheath gas Sh is set to 0.8 L per minute, for example. As the sheath gas Sh, an inert gas such as argon gas can be used, for example.

In the case where the helical support member 34 is provided in the third channel 27, since swirling flow is ejected as described earlier, the ejected sheath gas Sh surrounds the ejected droplets of the sample liquid Lf and the ejected nebulizing gas Gf so as to inhibit the lateral spreading of them. Further, the swirling flow facilitates the introduction of the droplets of the sample liquid Lf into the plasma by forming a region where the plasma is thin in the plasma generator 12.

The outlet 28a of the torch injector 28 can be formed downstream of the outlet 24a of the gas supply tube 24. As described earlier, the flow-focus effect allows the ejected droplets to spread in a narrower range in lateral directions with respect to the ejection direction. The tip end of the nebulizer 25 (the outlet 22a of the liquid supply tube 22 and the outlet 24a of the gas supply tube 24) is more distant from the plasma generator 12 than the outlet 28a of the torch injector 28 is. Consequently, the linear velocity of the ejected droplets can be reduced, and the adverse effects of the heat of the plasma can also be reduced.

Alternatively, the outlet 28a of the torch injector 28 may be disposed at the same position as the outlet 24a of the gas supply tube 24, relative to the direction of the central axis X. With this configuration, even when the flow rate of the sample liquid Lf is low, that is, even when a small amount of the droplets is ejected, the ejected droplets can be introduced into the plasma of the plasma generator 12 while being inhibited from diffusing in lateral directions with respect to the ejection direction.

According to the present embodiment, the nebulizer 25 includes the constriction portion 23a in the second channel 23 which is defined between the outer peripheral surface 22c of the liquid supply tube 22 and the inner peripheral surface 24b of the gas supply tube 24, and which allows the nebulizing gas Gf to flow therethrough, the constriction portion 23a being located upstream of the outlet 22a of the liquid supply tube 22. With this configuration, the nebulizer 25 can increase, at the constriction portion 23a, the pressure of the nebulizing gas Gf flowing through the second channel 23, and causes the nebulizing gas Gf that has passed through the constriction portion 23a to flow at an increased velocity, whereby the flow rate of the nebulizing gas Gf can be reduced as compared with the known art. Thus, the present embodiment provides the nebulizer 25 that can stably form the sample liquid Lf ejected from the outlet 22d of the liquid supply tube 22 into fine droplets. Furthermore, with this configuration, the nebulizer 25 can inhibit the droplets of the sample liquid Lf ejected from the outlet 22a of the liquid supply tube 22 from flowing backward through the second channel 23 and entering the constriction portion 23a, whereby the constriction portion 23a is inhibited from becoming clogged with components contained in the droplets of the sample liquid Lf, for example, due to a salt deposition, and stable ejection can be achieved.

Furthermore, the introduction unit 11 includes: the nebulizer 25; and the torch injector 28 that surrounds the gas supply tube with a gap interposed therebetween, the gap serving as the third channel 27 allowing the sheath gas Sh to flow therethrough, the torch injector 28 being disposed coaxially with the liquid supply tube 22 and the gas supply tube 24, and having the outlet 28a from which the sheath gas Sh is ejected, the outlet 28a being located on a side corresponding to the outlet 22a of the liquid supply tube 22. Thus, since the sample liquid Lf ejected from the nebulizer 25 is formed into fine droplets, and the sheath gas Sh ejected from the outlet 28a flows while surrounding the fine droplets of the sample liquid Lf, the sample introduction unit 11 can stabilize the flow in the ejection direction without allowing the liquid in the form of fine droplets to spread laterally.

Modifications 1 to 7 of the nozzle of the sample introduction unit 11 will be described below. In the following description of the modifications 1 to 7, elements and components different from those of the nozzle 40 shown in FIGS. 2A and 2B will be described, while the same or similar elements and components to those of the nozzle 40 will be denoted by the same reference characters and a description thereof will be omitted. The same or similar elements and components, a description of which will be omitted, exert the same or similar effects also in the modifications. For the sake of simplification of the description, the effects of the same or similar elements and components will be omitted. Like FIG. 2A, FIGS. 3 to 7A each show a cross section taken along the central axis X of the nebulizer 25, the central axis X extending in the longitudinal direction of the sample introduction unit 11.

FIG. 3 is a cross-sectional view of the modification 1 of the nozzle of the sample introduction unit according to the embodiment of the present invention. Referring to FIG. 3, in a nozzle 41 of the modification 1, a diameter defined by the outer peripheral surface 22*c* of the liquid supply tube 22 gradually decreases toward the outlet 22*a*, and a diameter-decrease start point 22*e* from which the diameter defined by the outer peripheral surface 22*c* decreases is formed upstream of the constriction portion 23*a*. This configuration facilitates focusing of the nebulizing gas Gf on the outlet 22*a* of the liquid supply tube 22, and inhibits the ejected sample liquid from spraying, thereby effectively forming droplets.

FIG. 4 is a cross-sectional view of the modification 2 of the nozzle of the sample introduction unit according to the embodiment of the present invention. Referring to FIG. 4, in a nozzle 42 of the modification 2, an tip end of the liquid supply tube 22 at an outlet 22*f* has a curved surface protruding downstream, as viewed in longitudinal cross section. This configuration further inhibits, in the vicinity of the outlet 22*f*, generation of a vortex of the nebulizing gas from the second channel 23, and allows the nebulizing gas to flow along the mist flow of the ejected droplets.

FIG. 5 is a cross-sectional view of the modification 3 of the nozzle of the sample introduction unit according to the embodiment of the present invention. Referring to FIG. 5, in a nozzle 43 of the modification 3, a diameter defined by the outer peripheral surface 22*c* of the liquid supply tube 22 gradually decreases toward the outlet 22*a*, and a diameter-decrease start point 22*e* from which the diameter defined by the outer peripheral surface 22*c* decreases is formed upstream of the constriction portion 23*a*.

A diameter defined by an inner peripheral surface 22*g* of the liquid supply tube 22 gradually decreases toward the outlet 22*a*. This configuration can further narrow lateral spreading (i.e., the so-called spray angle) of the mist flow of the droplets of the sample liquid Lf with respect to the ejection direction, as compared with the nozzle 40 shown in FIGS. 2A and 2B, for example. An inner diameter D1*a* of the outlet of the liquid supply tube 22 is preferably 5 μm to 75 μm in order to form fine droplets. An inner diameter D1*b* of a region where the diameter does not decrease is preferably 10 μm to 250 μm in order to facilitate delivery of the sample liquid.

FIGS. 6A and 6B are cross-sectional view of the modifications 4 and 5 of the nozzle of the sample introduction unit according to the embodiment of the present invention. Referring to FIG. 6A, in a nozzle 44 of the modification 4, the outlet 24*a* of the gas supply tube 24 is located at the same position as the outlet 22*a* of the liquid supply tube 22, relative to the longitudinal direction of the sample introduction unit 11. That is, relative to the direction of the central axis X, the outlet 24*a* of the gas supply tube 24 is located at the same position as the outlet 22*a* of the liquid supply tube 22. With this configuration, even when the flow rate of the sample liquid Lf is low, that is, even when a small amount of the droplets is ejected, the ejected droplets can be introduced into the plasma of the plasma generator 12 while being inhibited from diffusing in lateral directions with respect to the ejection direction.

Further, in the nozzle 44, the outlet 28*a* of the torch injector 28 is formed downstream of the outlet 24*a* of the gas supply tube 24 and the outlet 22*a* of the liquid supply tube 22. With this configuration, the outlet 22*a* of the liquid supply tube 22 and the outlet 24*a* of the gas supply tube 24 are more distant from the plasma generator 12 than the outlet 28*a* of the torch injector 28 is, so that the linear velocity of the droplets can be reduced before the droplets reach the plasma of the plasma generator 12.

Referring to FIG. 6B, in a nozzle 45 of the modification 5, the outlet 28*a* of the torch injector 28, the outlet 24*a* of the gas supply tube 24, and the outlet 22*a* of the liquid supply tube 22 are all located at the same position, relative to the longitudinal direction of the nebulizer. In other words, the nozzle 45 corresponds to the nozzle 44 shown in FIG. 6A in which the outlet 28*a* of the torch injector 28 is located at the same position as the outlet 24*a* of the gas supply tube 24 and the outlet 22*a* of the liquid supply tube 22, relative to the direction of the central axis X. With this configuration, even when the flow rate of the sample liquid Lf is low, that is, even when a small amount of the droplets is ejected, the ejected droplets can be introduced into the plasma of the plasma generator 12 while being inhibited from diffusing in lateral directions with respect to the ejection direction.

FIGS. 7A and 7B are cross-sectional view of the modifications 6 and 7 of the nozzle of the sample introduction unit according to the embodiment of the present invention. Referring to FIG. 7A, in a nozzle 46 of the modification 6, a diameter defined by the inner peripheral surface 28*b* of the torch injector 28 gradually decreases from an upstream portion toward the outlet 28*a*, and a diameter D3 defined by the inner peripheral surface 28*b* of the outlet 28*a* is larger than a diameter D2 defined by the inner peripheral surface of the outlet 24*a* of the gas supply tube 24. With this configuration, the sheath gas Sh flowing through the third channel 27 is ejected while converging. The converging sheath gas Sh inhibits back flow into the outlet 24*a* of the gas supply tube 24 and inhibits the mist flow of the droplets of the sample liquid from being disturbed. This configuration can further narrow the lateral spreading (i.e., the so-called spray angle) of the mist flow of the droplets of the sample liquid with respect to the ejection direction.

Referring to FIG. 7B, in a nozzle 47 of the modification 7, a diameter defined by the inner peripheral surface 28*b* of the torch injector 28 gradually decreases from an upstream portion toward the outlet 28*a*, and a diameter D3*a* defined by the inner peripheral surface of the outlet 28*a* is equal to a diameter D2*a* defined by the inner peripheral surface of the outlet 24a of the gas supply tube 24. This configuration can further enhance the above-described effect of the nozzle 46 shown in FIG. 7A.

Measurement Example 1: Miniaturization of Diameter of Ejected Droplets

In a measurement example 1, a measurement was conducted on a particle size density of droplets ejected by the nebulizer according to the embodiment of the present invention. As an example, a nozzle having the configuration shown in FIG. 5 was used. The inner diameter defined by the inner peripheral surface of the liquid supply tube (the diameter of the first channel) is 150 µm, the diameter defined by the outer peripheral surface is 375 μm, the outlet (tip end) of the liquid supply tube has an inner diameter of 30 μm, and an outer diameter of 50 μm. The diameter defined by the inner peripheral surface of the gas supply tube is 800 μm (i.e., the gap length of the second channel is 213 μm). In the constriction portion, the gap length of the of the second channel is 10 μm. The constriction portion is located upstream from the outlet of the liquid supply tube by 200 μm.

FIG. 8 is a cross-sectional view of a nozzle of a nebulizer of a comparative example. The nebulizer of the comparative example is disclosed in a paper (Non-Patent Document 1) written by the presented inventors. Referring to FIG. 8, the nozzle 100 has a triple tube structure and is composed of a liquid supply tube 102 and a gas supply tube 104 consisting of a double tube surrounding the liquid supply tube 102. The liquid supply tube 102 has a channel 101 for allowing a sample liquid Lf to flow therethrough. The liquid supply tube 104 consists of an inner tube 105 and an outer tube 106, has a channel 108 of nebulizing gas Gf which is defined between an outer peripheral surface 105*c* of the inner tube 105 and an inner peripheral surface 106*b* of the outer tube 106. The nebulizing gas Gf is ejected from an ejection port 108*a*. In the liquid supply tube 102, the channel has an inner diameter of 50 μm, the outlet 102*a* has an inner diameter of 20 μm. The outer tube 106 of the gas supply tube 104 has an outlet 106*a* an inner diameter of which is 250 μm.

The ejection port 108*a* of the channel 108 for the nebulizing gas Gf has the smallest channel area (a gap length of 17 μm). The distance between the outlet 106*a* and the outlet 102*a* of the liquid supply tube 102 is 25 μm to 50 μm.

Pure water as the sample liquid Lf and argon gas as the nebulizing gas Gf were used and supplied to the nebulizers of the example and the comparative example at a flow rate of 0.1 mL per minute and a flow rate of 0.25 mL per minute, respectively, so that droplets were ejected. By laser diffraction (using Aerotrac SPM MODDEL 7340 manufactured by MicrotracBEL Corp.), the droplet size distribution at a distance of 10 mm in the ejection direction from a tip end of the nozzle was measured.

FIG. 9 is a graph showing a measurement example of the particle size distribution of the droplets ejected from the nozzle of the example and the nozzle of the comparative example. FIG. 9, in which the horizontal axis represents a log scale, shows that the area where the droplet diameters of the example are distributed is considerably smaller the area where the droplet diameters of the comparative example are distributed. Thus, the nozzle of the example formed finer droplets.

The table below confirms this result. The table shows that at a volume frequency of 50% and a volume frequency of 90%, the droplet diameter of the example is about one-fourth the droplet diameter of the comparative example, or smaller. Further, referring to the Sauter's mean diameter in which the volume and surface area of the droplet are taken into account, the Sauter's mean diameter of the example is about one-sixth the Sauter's mean diameter of the comparative example. This also shows that miniaturization of the droplet was promoted in the example.

TABLE 1

| | Droplet Diameter at Volume Frequency of 50% (μm) | Droplet Diameter at Volume Frequency of 90% (μm) | Sauter's Mean Diameter (μm) |
|---|---|---|---|
| Example | 4.1 | 10.1 | 3.5 |
| Comparative Example | 24.4 | 39.1 | 21.1 |

Measurement Example 2: Stability of Droplet Ejection

As a measurement example 2, a measurement was conducted on stability of the droplet ejection of the above-described nebulizers of the example and the comparative example.

The nebulizer of the example was inserted in a torch injector 28 of a sample introduction unit 11, and set using a fastening member 33 and a support member 34, and connected to a plasma generator of an ICP-MS device, in the manner shown in FIGS. 1, 2A and 2B. Argon gas was used as the nebulizing gas Gf, the sheath gas Sh, the auxiliary gas Ar, and the plasma gas P1. The flow rates of which were set to 0.25 L, 0.6 L, 0.9 L, and 15 L per minute, respectively.

The nebulizer of the comparative example is connected to a plasma generator of an ICP-MS device via an axial cylinder chamber and a plasma torch (see Non-Patent Document 1). Argon gas was used as the nebulizing gas and the sheath gas. The flow rates of which were set to 0.80 L and 0.40 L per minute, respectively.

A standard stock solution of yttrium element (product number 47012-1B manufactured by KANTO CHEMICAL CO., INC.) was diluted with ultrapure water, and the resultant solution (including 1 nanogram of yttrium per 1 g) was used as the sample liquid Lf. The flow rate was set to 10 μL per minute. The ICP-MS device used was Agilent 7700x, and the output to the coil of the plasma generator was set to 1.5 kW. The integration time per point of signal intensity of yttrium ions was set to 1.5 seconds.

FIG. 10 is a graph showing a measurement example of trace elements contained in the sample liquid ejected by the nebulizer of the example and the nebulizer of the comparative example. Referring to FIG. 10, the signal intensity of yttrium is more stable in the example than in the comparative example. The relative standard deviation of the signal intensity of yttrium in a period of 120 seconds was 1.6% in the example and 1.8% in the comparative example. This result demonstrates that the nebulizer of the example ejected droplets more stably than the nebulizer of the comparative example. The relative standard deviation was calculated according to the following formula: standard deviation/average value×100(%).

Measurement Example 3: Ejection of Sample Liquid Containing Particulate Matter

As a measurement example 3, a measurement was conducted on stability of droplet ejection using a dispersion of gold (Au) nanoparticles, as the sample liquid. As the Au nanoparticles, Standard Reference Material RM 8013 (nominal particle size of 60 nm) of the U.S. National Institute of Standards and Technology (NIST) was dispersed in pure water. The resultant dispersion was used in the measurement.

The nebulizer of the example was set in the sample introduction unit 11 in the same manner as in the measurement example 2. Argon gas was used as the nebulizing gas, the sheath gas, the auxiliary gas, and the plasma gas. The flow rates of which were set to 0.25 L, 0.6 L, 0.9 L, and 15 L per minute, respectively. The flow rate of the dispersion containing the Au nanoparticles was set to 10 µL per minute. The ICP-MS device used was Agilent 7700x. The output to the coil of the plasma generator was set to 1.5 kW. The integration time per point of signal intensity of gold ions was set to 0.1 millisecond.

Figure 11:
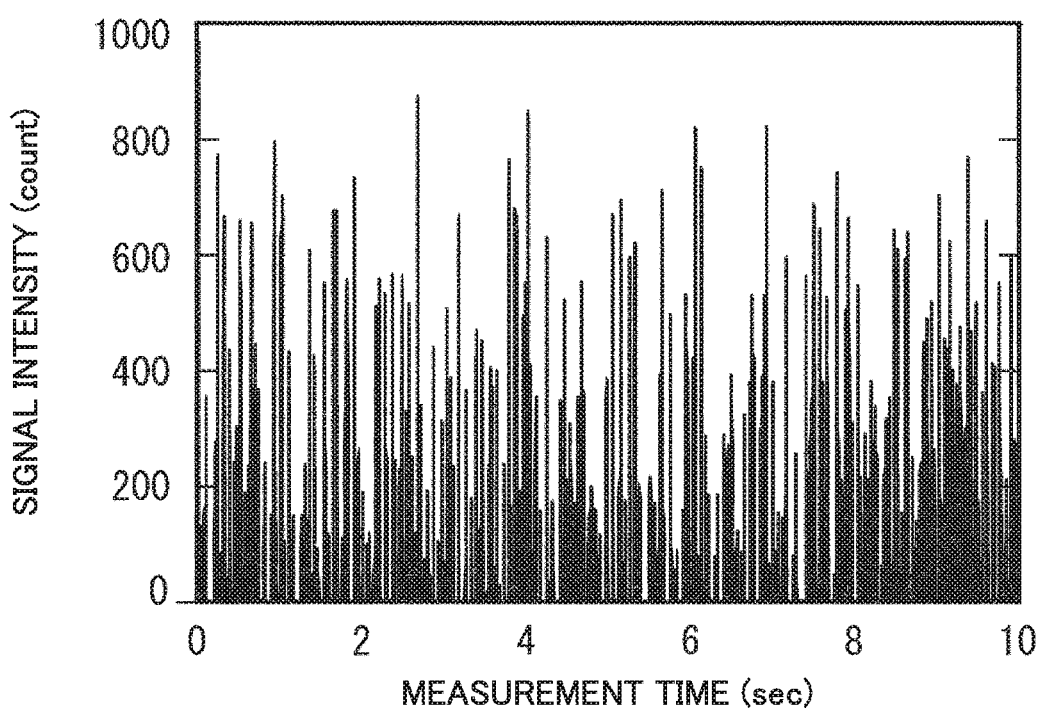
FIG. 11 is a graph showing a measurement example of a dispersion containing gold nanoparticles ejected into an ICP-MS equipped with the sample introduction unit of the example.

Shown is a measurement example of the dispersion containing the gold nanoparticles ejected into the ICP-MS device equipped with the sample introduction unit of the example. Referring to FIG. 11, the signal intensity of gold ions was stable even in the measurement in units of 0.1 millisecond. This measurement shows that the nebulizer of the example ejected fine droplets and that the ejection of Au nanoparticles was performed stably.

In the foregoing, the preferred embodiments of the present invention have been described in detail. However, the present invention is not limited to the specific embodiments, and various modifications and changes can be made within the scope of the present invention described in the claims. For example, the configuration of the nozzle of the embodiment and that of the nozzle of the modifications 1 to 7 may be combined with each other.

In the above description, cross section of the liquid supply tube and the first channel are in the shape of a circular. However, the cross section of the liquid supply tube and the first channel may be in the shape of a triangle, a square, a pentagon, a hexagon, any other polygon, an ellipse, etc. The outer and inner peripheral surfaces of the gas supply tube can define a shape selected from the above shapes, in conformity with the cross-sectional shape of the liquid supply tube.

Further, the nebulizer according to the present embodiment is usable in ICP-OES and ICP-MS for performing ordinary element analysis, quantitative analysis of a composition, a size, and a number concentration of fine particles in a dispersion, drug delivery system (DDS) monitoring using particles, and the like. The nebulizer according to the present embodiment is further usable for cell counting, component analysis and metabolic analysis of individual cells, element analysis and chemical form analysis of a biological sample, and the like. Furthermore, the nebulizer according to the embodiment of the present invention is also usable for spray-sintering granulation such as plasma-sintering granulation and plasma modification.

Regarding the above description, the following additional remarks disclose further embodiments.

Additional Remarks 1

A nebulizer includes:
a liquid supply tube having a first channel which allows a liquid to flow therethrough, and having, at an end thereof, a first outlet from which the liquid is ejected; and
a gas supply tube surrounding the liquid supply tube with a gap interposed therebetween, having a second channel which allows a gas to flow therethrough, and having, at an end corresponding to the end, a second outlet from which the gas is ejected,
the second channel being defined between an outer peripheral surface of the liquid supply tube and an inner peripheral surface of the gas supply tube, and having a constriction portion located upstream of the first outlet.

Additional Remarks 2

In the nebulizer according to the additional remarks 1, the second channel has a channel area gradually decreasing in an upstream-to-downstream direction, and
the constriction portion is where the channel area is minimized.

Additional Remarks 3

In the nebulizer according to the additional remark 1 or 2, the second channel has a channel area gradually increasing from the constriction portion to at least the first outlet of the liquid supply tube.

Additional Remarks 4

In the nebulizer according to any one of the additional remarks 1 to 3, a diameter defined by the inner peripheral surface of the gas supply tube gradually increases from the constriction portion toward the second outlet.

Additional Remarks 5

In the nebulizer according to any one of the additional remarks 1 to 4, the second outlet of the gas supply tube is formed downstream of the first outlet of the liquid supply tube.

Additional Remarks 6

In the nebulizer according to any one of the additional remarks 1 to 3, the second outlet of the gas supply tube is formed at the same position as the first outlet of the liquid supply tube, relative to a longitudinal direction of the nebulizer.

Additional Remarks 7

In the nebulizer according to any one of the additional remarks 1 to 6, a diameter defined by an inner peripheral surface of the second outlet of the gas supply tube is larger than a diameter defined by an inner peripheral surface of the first outlet of the liquid supply tube.

Additional Remarks 8

In the nebulizer according to any one of the additional remarks 1 to 7, a diameter defined by the outer peripheral surface of the liquid supply tube gradually decreases toward the first outlet.

Additional Remarks 9

In the nebulizer according to the additional remarks 8, a point from which the diameter defined by the outer peripheral surface of the liquid supply tube increases is located upstream of the constriction portion.

Additional Remarks 10

In the nebulizer according to the additional remarks 8, a point from which the diameter defined by the outer peripheral surface of the liquid supply tube increases is located downstream of the constriction portion.

Additional Remarks 11

In the nebulizer according to any one of the additional remarks 1 to 10, a diameter defined by the inner peripheral surface of the liquid supply tube gradually decreases toward the first outlet.

Additional Remarks 12

In the nebulizer according to any one of the additional remarks 1 to 10, a diameter defined by the inner peripheral surface of the liquid supply tube is constant toward the first outlet.

Additional Remarks 13

In the nebulizer according to any one of the additional remarks 1 to 12, in a cross section along the longitudinal direction of the nebulizer, a tip end of the liquid supply tube at the first outlet is pointed downstream.

Additional Remarks 14

In the nebulizer according to any one of the additional remarks 1 to 12, in a cross section along the longitudinal direction of the nebulizer, a tip end of the liquid supply tube at the first outlet has a curved surface protruding downstream.

Additional Remarks 15

A sample introduction unit includes:

the nebulizer according to any one of the additional remarks 1 to 14; and an other gas supply tube surrounding the gas supply tube with an other gap interposed therebetween, the other gap serving as a third channel which allows an other gas to flow therethrough, the other gas supply tube being disposed coaxial with the liquid supply tube and the gas supply tube, and having, at an end corresponding to the end, a third outlet from which the other gas is ejected.

Additional Remarks 16

In the sample introduction unit according to the additional remarks 15, the third outlet of the other gas supply tube is formed downstream of the second outlet of the gas supply tube.

Additional Remarks 17

In the sample introduction unit according to the additional remarks 15 or 16, the third outlet of the other gas supply tube is formed at the same position as the second outlet, relative to the longitudinal direction of the nebulizer.

Additional Remarks 18

In the sample introduction unit according to any one of the additional remarks 15 to 17, the other gas supply tube has an inner peripheral surface parallel to a central axis of the nebulizer.

Additional Remarks 19

In the sample introduction unit according to any one of the additional remarks 15 to 17, a diameter defined by an inner peripheral surface of the other gas supply tube gradually decreases from an upstream portion toward the third outlet, and a diameter defined by an inner peripheral surface of a tip end of the third outlet is equal to or larger than a diameter defined by an inner peripheral surface of a tip end of the second outlet of the gas supply tube.

Additional Remarks 20

In the sample introduction unit of the additional remarks 19, the third outlet is formed at the same position as the first and second outlets, relative to the longitudinal direction of the nebulizer.

Additional Remarks 21

The sample introduction unit according to any one of the additional remarks 15 to 20 further includes, at an end opposite to the end, a fastening member which fastens the gas supply tube to the other gas supply tube.

Additional Remarks 22

The sample introduction unit according to any one of the additional remarks 15 to 21 further includes a gap member which has a helical shape, is wound around the outer peripheral surface of the gas supply tube, extends in a flow direction, and thereby provides the other gap.

Additional Remarks 23

An analysis device includes:

the sample introduction unit according to any one of the additional remarks 15 to 22;

a plasma generator for generating a plasma and ionizing or atomizing, with the plasma, a sample formed into droplets and ejected by the nebulizer; and an analysis unit for analyzing the atomized or ionized sample.

EXPLANATION OF REFERENCE NUMERALS

10: Analysis Device
11: Sample Introduction Unit
12: Plasma Generator
14: Analysis Unit
21: First Channel
22: Liquid Supply Tube
**22*a*, 22*f*, 24*a*, 28*a***: Outlet
**22*b*, 22*g*, 24*b*, 28*b***: Inner Peripheral Surface
**22*c*, 24*c*, 28*c***: Outer Peripheral Surface
**22*d*, 22*e***: Diameter-Decrease Start Point 23: Second Channel
23a: Constriction Portion
24: Gas Supply Tube
25: Nebulizer
26: Plasma Torch
27: Third Channel
28: Torch Injector
29: Fourth Channel
30: Intermediate Torch Tube
31: Fifth Channel
33: Fastening Member
34: Support Member
Lf: Sample Liquid
Gf: Nebulizing gas
Sh: Sheath Gas

The invention claimed is:

1. A nebulizer comprising:
a liquid supply tube having a first channel which allows a liquid to flow therethrough, and having, at an end thereof, a first outlet from which the liquid is ejected; and
a gas supply tube surrounding the liquid supply tube with a gap interposed therebetween, having a second channel which allows a gas to flow therethrough, and having, at an end corresponding to the end, a second outlet from which the gas is ejected,
the second channel being defined between an outer peripheral surface of the liquid supply tube and an inner peripheral surface of the gas supply tube, having a constriction portion located upstream of the first outlet, and having a channel area gradually increasing from the constriction portion to at least the first outlet of the liquid supply tube.

2. The nebulizer according to claim 1, wherein
the channel area of the second channel gradually decreases in an upstream-to-downstream direction, and
the constriction portion is where the channel area is minimized.

3. The nebulizer according to claim 1, wherein
a diameter defined by the inner peripheral surface of the gas supply tube gradually increases from the constriction portion toward the second outlet.

4. The nebulizer according to claim 1, wherein
the second outlet of the gas supply tube is formed downstream of the first outlet of the liquid supply tube.

5. The nebulizer according to claim 1, wherein
the second outlet of the gas supply tube is formed at the same position as the first outlet of the liquid supply tube, relative to a longitudinal direction of the nebulizer.

6. The nebulizer according to claim 1, wherein
a diameter defined by an inner peripheral surface of the second outlet of the gas supply tube is larger than a diameter defined by an inner peripheral surface of the first outlet of the liquid supply tube.

7. The nebulizer according to claim 1, wherein
a diameter defined by the outer peripheral surface of the liquid supply tube gradually decreases toward the first outlet.

8. The nebulizer according to claim 1, wherein
a diameter defined by an inner peripheral surface of the liquid supply tube gradually decreases toward the first outlet.

9. The nebulizer according to claim 1, wherein
in a cross section along a longitudinal direction of the nebulizer, a tip end of the liquid supply tube at the first outlet is pointed downstream.

10. The nebulizer according to claim 1, wherein
in a cross section along a longitudinal direction of the nebulizer, a tip end of the liquid supply tube at the first outlet has a curved surface protruding downstream.

11. A sample introduction unit comprising:
a nebulizer including a liquid supply tube having a first channel which allows a liquid to flow therethrough, and having, at an end thereof, a first outlet from which the liquid is ejected; and
a gas supply tube surrounding the liquid supply tube with a gap interposed therebetween, having a second channel which allows a gas to flow therethrough, and having, at an end corresponding to the end, a second outlet from which the gas is ejected,
the second channel being defined between an outer peripheral surface of the liquid supply tube and an inner peripheral surface of the gas supply tube, and having a constriction portion located upstream of the first outlet, and having a channel area gradually increasing from the constriction portion to at least the first outlet of the liquid supply tube; and
an other gas supply tube surrounding the gas supply tube with an other gap interposed therebetween, the other gap serving as a third channel which allows an other gas to flow therethrough, the other gas supply tube being disposed coaxial with the liquid supply tube and the gas supply tube, and having, at an end corresponding to the end, a third outlet from which the other gas is ejected.

12. The sample introduction unit according to claim 11, wherein
the third outlet of the other gas supply tube is formed downstream of the second outlet of the gas supply tube.

13. The sample introduction unit according to claim 11, wherein
a diameter defined by an inner peripheral surface of the other gas supply tube gradually decreases from an upstream portion toward the third outlet, and
a diameter defined by an inner peripheral surface of a tip end of the third outlet is equal to or larger than a diameter defined by an inner peripheral surface of a tip end of the second outlet of the gas supply tube.

14. The sample introduction unit according to claim 11, wherein
an inner peripheral surface of the other gas supply tube extends while defining a constant diameter from an upstream portion to the third outlet.

15. The sample introduction unit according to claim 11, further comprising
a gap member which has a helical shape, is wound around an outer peripheral surface of the gas supply tube, extends in a flow direction, and thereby provides the other gap.

16. An analysis device comprising:
a sample introduction unit including a nebulizer that includes a liquid supply tube having a first channel which allows a liquid to flow therethrough, and having, at an end thereof, a first outlet from which the liquid is ejected, and
a gas supply tube surrounding the liquid supply tube with a gap interposed therebetween, having a second channel which allows a gas to flow therethrough, and having, at an end corresponding to the end, a second outlet from which the gas is ejected,
the second channel being defined between an outer peripheral surface of the liquid supply tube and an inner peripheral surface of the gas supply tube, and having a constriction portion located upstream of the first outlet, and an other gas supply tube surrounding the gas supply tube with an other gap interposed therebetween, the other gap serving as a third channel which allows an other gas to flow therethrough, the other gas supply tube being disposed coaxial with the liquid supply tube and the gas supply tube, and having, at an end corresponding to the end, a third outlet from which the other gas is ejected;

a plasma generator generating a plasma and ionizing or atomizing, with the plasma, a sample formed into droplets and ejected by the nebulizer; and an analysis unit analyzing the atomized or ionized sample.

* * * * *